Dec. 20, 1966  J. T. MILLER  3,293,041
BEVERAGE EXTRACT TABLETTING METHOD
Filed Jan. 11, 1963  3 Sheets-Sheet 1
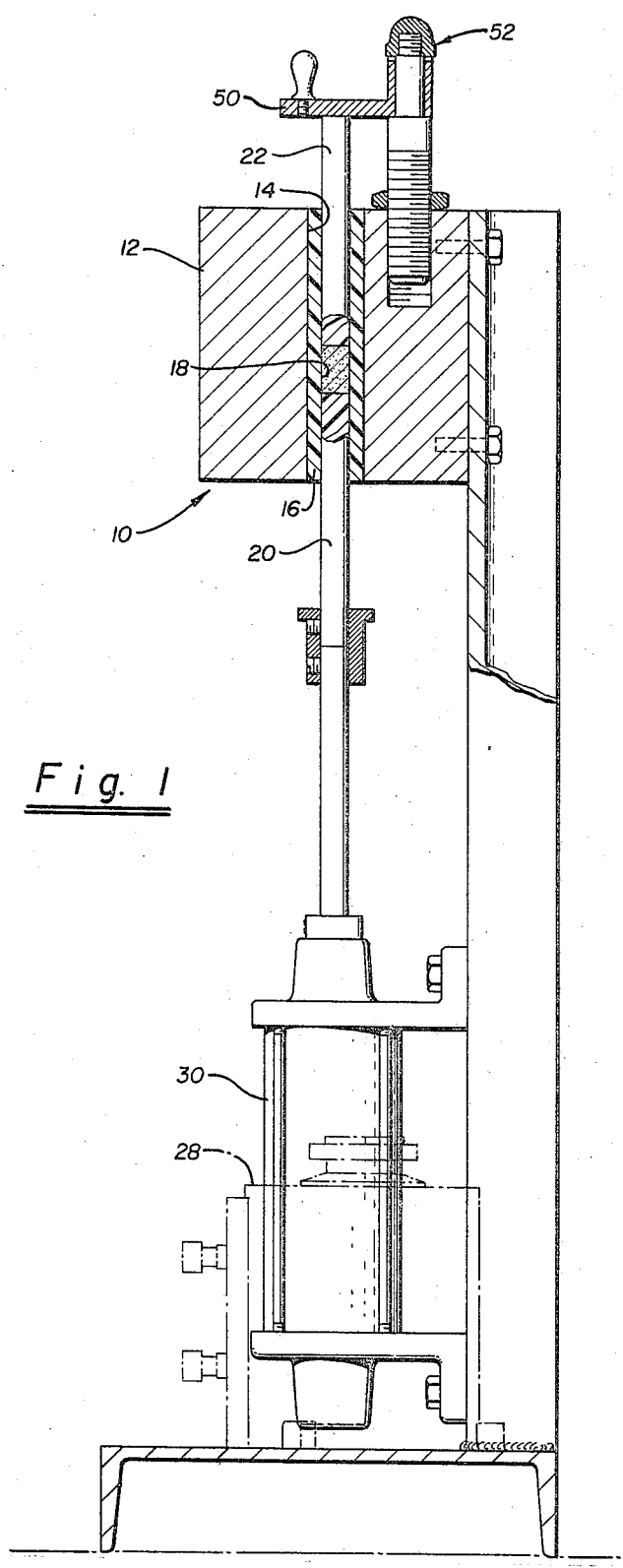
Fig. 1
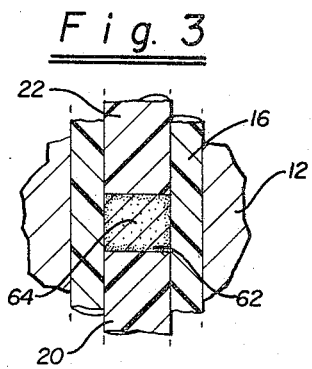
Fig. 3
Fig. 4
Fig. 5
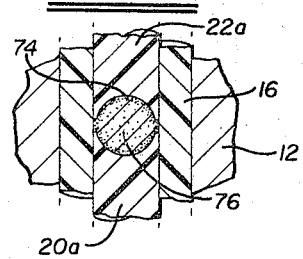
Fig. 6
Fig. 7
INVENTOR.
Jarrott T. Miller
BY
Attorneys INVENTOR.
Jarrott T. Miller
BY
Attorneys Dec. 20, 1966 J. T. MILLER 3,293,041
BEVERAGE EXTRACT TABLETTING METHOD
Filed Jan. 11, 1963 3 Sheets-Sheet 3

INVENTOR.
Jarrott T. Miller
BY
Attorneys

United States Patent Office 3,293,041
Patented Dec. 20, 1966

3,293,041
BEVERAGE EXTRACT TABLETTING METHOD
Jarrott T. Miller, San Mateo, Calif., assignor to Hills Bros. Coffee, Inc., San Francisco, Calif., a corporation of California
Filed Jan. 11, 1963, Ser. No. 250,900
8 Claims. (Cl. 99—66)

This invention relates generally to soluble beverage extracts in tablet form, and more particularly to such tablets produced from the dried extracts of coffee or tea, without the use of a binder.

The popularity and consumer acceptance of soluble or "instant" coffee was greatly enhanced by familiarity and use of this product in "field rations" employed in World War II. In its early period of rapid growth following the war, soluble coffee in dry form (powdered or granular) was either all coffee or what is known in the trade as "product type" or "filled type" (i.e., coffee with carbohydrates added). With continuing improvement in the quality of soluble coffee, a distinct consumer preference was soon evidenced in favor of the all coffee product, and today, virtually all soluble coffee sold commercially is of this type. Sales of soluble or instant coffee, so named because of its ready preparation into a beverage simply by adding hot water, have now increased to the point that approximately one out of every three or four cups of coffee prepared in the U.S. home is of the soluble type. In addition, practically all coffee sold through commercial vending machines is of this type.

In recent years, increasing interest has also been shown in soluble or instant tea products. Commercial types include the all soluble tea products as well as "filled" types employing additives to enhance flavor and improve keeping qualities.

Despite the widespread use and acceptance of soluble beverage extracts, and particularly soluble coffee, such use has not been entirely free of objection. For example, it is customary to distribute soluble coffee as a loose powder in glass or metal containers, from which an appropriate amount must be removed by use of a spoon or other measuring implement. There consequently is a possibility of wide fluctuation in the strength or quality of coffee prepared, as well as frequent loss of the product, or "mess," through spillage. In addition, since soluble coffee is still used in most households as a supplementary product to conventionally brewed coffee, the contents of a container of coffee powder may not be wholly consumed for several weeks or even several months. During this period the loose powder not only tends to pick up moisture by hygroscopic action, causing it to pack or lump so that it is difficult to remove from the container, but there generally is a marked deterioration and loss of flavor and aroma due to the volatility and susceptibility to oxidation of the flavor and aroma oils exposed over the large surface of the finely divided powder. These difficulties, as well as the loss of flowability of the powder through moisture pickup, create problems of even greater complexity when the coffee powders are used in commercial vending machines.

Heretofore, efforts have been made to overcome some of the disadvantages mentioned above by providing soluble coffee in the form of tablets which would expose a minimum surface to the surrounding environment. However, in every case, workable tablets have only been produced through use of a suitable binder, such as sugar, starch, lactose, gelatin, or similar materials. As a result, such products have not been commercially successful, due principally to the consumer familiarity and preference for the all coffee type of soluble product and also to the fact that the binder tends to retard the rate of dissolving of the tablets. A solution to the problem of providing a readily soluble, satisfactory, all coffee or similar extract tablet, without the use of a binder, is consequently highly to be desired.

In general, it is an object of the present invention to provide a water soluble or water dispersible beverage extract in tablet form which will provide a practical solution to the above problems, and to additional problems, as will appear.

Another object of the invention is to provide a soluble beverage product essentially comprised of coffee or tea extract, which will be in the form of stable convenient tablets capable of being added in an appropriate amount to a cup or other predetermined quantity of hot or cold water, to consistently produce beverage of uniform strength or quality.

A particular object of the invention is to provide a soluble coffee extract tablet of the above type, composed entirely of coffee extract.

Another object of the invention is to provide a soluble extract tablet of the above type which, although characterized by relatively low density, possesses good durability and handling characteristics so as to render it satisfactory for use in the home, in restaurants, vending machines and the like.

Another object of the invention is to provide a soluble extract tablet of the above character which is stable, relatively non-hygroscopic, and characterized by improved shelf life as compared to the product in powdered or granular form.

Another object of the invention is to provide a new method or process for producing soluble extract tablets of the above type.

Another object of the invention is to provide a method or process for such purpose which requires the use of relatively low pressures.

Another object of the invention is to provide a method or process of such character in which relatively low or moderate heating is employed during the forming of the extract material into tablets.

Other objects and advantages of the invention will appear from the following description in which an exemplary embodiment has been set forth in detail in conjunction with the drawings, in which:

FIGURE 1 is a view in section and elevation of apparatus useful in carrying out the present invention;

FIGURE 3 is an enlarged detail view, similar to FIGURE 1, illustrating a feature of the invention;

FIGURES 4 and 5 are perspective views illustrating products in tablet form, produced by the apparatus of FIGURES 1 and 2;

FIGURE 6 is a view like FIGURE 3, illustrating a modification of the apparatus;

FIGURE 7 is a perspective view of a product in tablet form, produced by the apparatus of FIGURE 6;

The present invention is predicated on my discovery that highly soluble self-supporting tablets can be produced from dried beverage extracts, such as coffee or tea extracts, through the rapid application of moderate heat and low pressure. I have unexpectedly found that such conditions produce tablets having a cohesive relatively low density interior and thin high density outer surface or crust which renders the tablets uniquely suited to rapid reconstitution into the original beverage.

My processing generally involves the introduction of a quantity of beverage extract material into a forming zone, coupled with the simultaneous application of heat and pressure to exterior or surface portions of the extract material, to form a thin, heat compressed film only on surface portions of an essentially unheated tablet interior. This protective film or crust imparts considerable mechanical strength to the tablet so that it is substantially shape-retaining. It also renders the tablet more resistant to moisture pickup than the loose extract material from which it was formed, until such time as the tablet is introduced into hot or cold water to produce the reconstituted beverage. At such time, the lightly compressed, heat bonded characteristic of the outer crust provides a readily wettable surface that rapidly disintegrates and dissolves in the water, permitting the low density interior of loosely aggregated beverage extract to quickly disperse and dissolve. The result is a unique tablet product, capable of being produced in virtually any shape or size without the use of binders or additives, and providing a solubility equivalent to the commercially available powdered or "instantized" product.

My product is best described by reference to the particular material undergoing processing, which in the preferred embodiment of the invention comprises soluble or instant coffee.

In accordance with the invention, soluble or instant coffee tablets can be prepared from any of the dry finely divided coffee extract materials (i.e., instant coffee powders) currently on the market. Dry soluble extracts of this type are prepared in various ways from ground roasted coffee by brewing the coffee, separating the grounds from the resulting brew and drying the resulting brew to recover the dissolved solids as a finely divided extract material. Variations are frequently employed in the processing, for example to minimize the loss of volatile aroma and taste imparting components (e.g., as in Patent No. 2,562,206) to increase the yield of soluble material (e.g., as in Patent No. 2,915,399), or to otherwise vary the characteristics of the soluble extract material. In general, all such soluble extract materials may be employed in producing the products of the present invention, as the particular processing employed to obtain the dried coffee extract used as a starting material forms no part of the invention.

Figure 2:
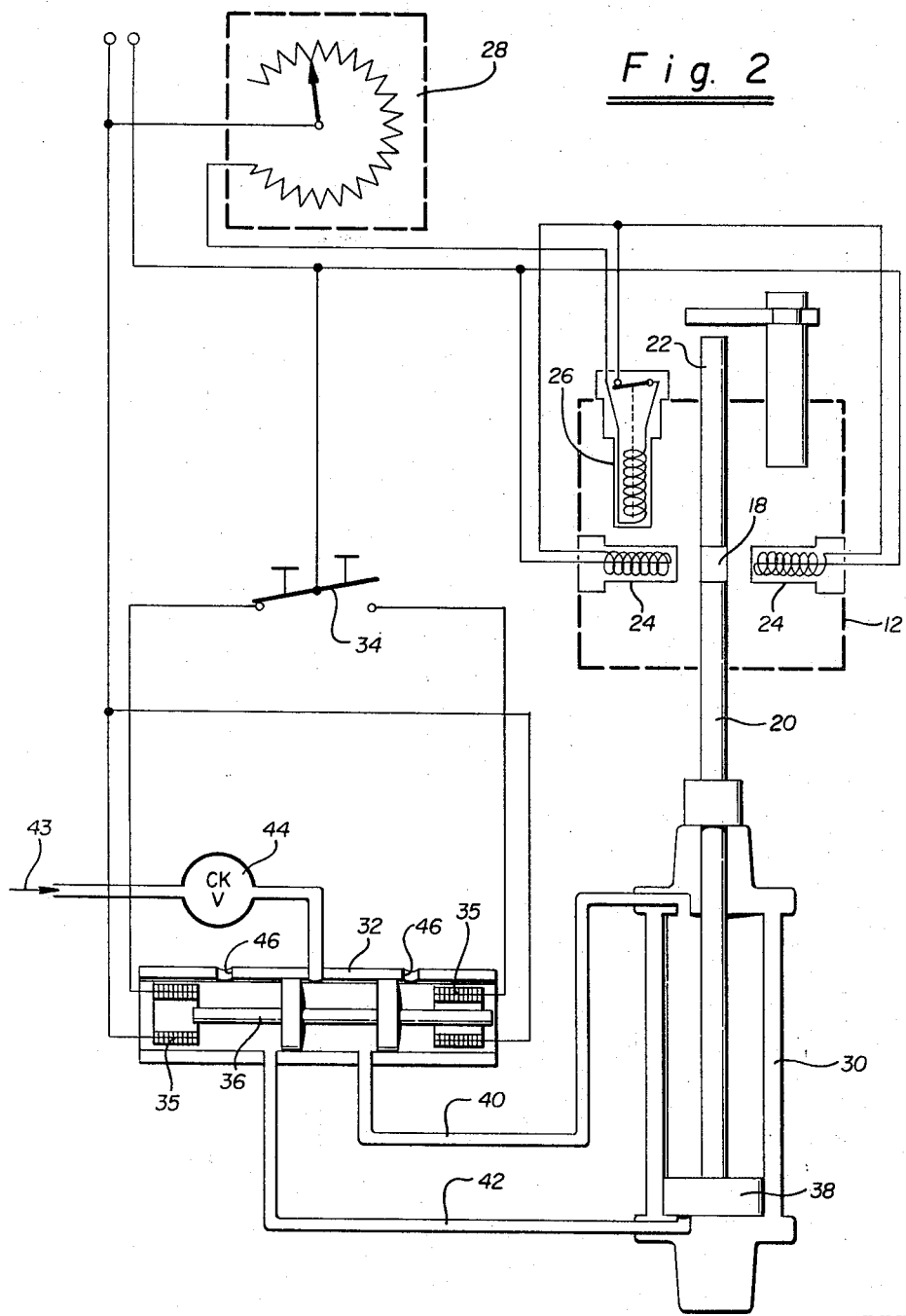
FIGURE 2 is a schematic view illustrating the operation thereof.
Figure 10:
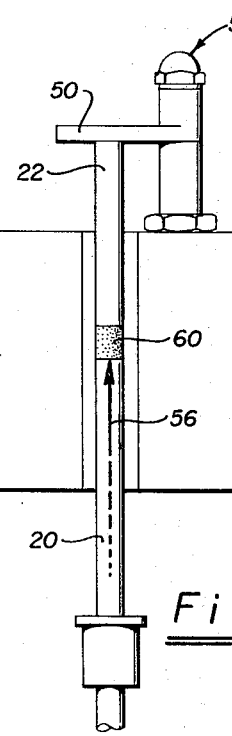
Figure 11:
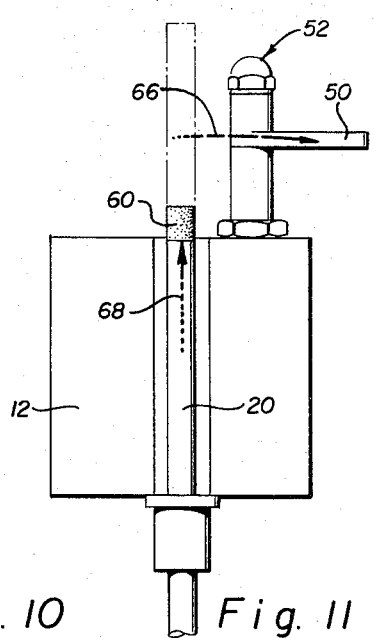

An understanding of the particular process employed in making the new coffee tablets will be facilitated by a description of the apparatus illustrated in the drawing. As shown in the embodiment illustrated in FIGURES 1 and 2, 10 represents a tablet forming unit consisting of a die component or block 12 provided with a vertical aperture or bore 14. The latter is lined with a suitable insulating material 16, for example polytetrafluoroethylene (Teflon) or similar material characterized by low heat conductivity. The liner 16 generally defines a vertical tablet forming zone 18 delineated at its upper and lower ends by two relatively movable die components 20 and 22, each formed of the same insulating material as the liner.

Referring to FIGURE 2, means are provided for heating the block 12 to a temperature at which sufficient bonding occurs to form a shape-retaining, thin, wettable shell or crust around the aggregated interior particles. In the case of soluble coffee this temperature is within the range from about 190 to 325° F. The illustrated apparatus for this purpose comprises heat cartridges 24 positioned within the block 12, adjacent the forming zone 18, and regulated to a desired constant temperature by an electrical control circuit including the thermostat 26 and rheostat 28. Means are also provided to move the die component 20 vertically into the tablet forming space 18, at a desired relatively low pressure (i.e., ranging from about 1 to 40 p.s.i.). As illustrated, such means comprises the air cylinder 30 operated by the solenoid controlled spool valve assembly 32. As will be readily understood by one in this art, actuation of the reversing switch 34 energizes a solenoid 35 to shift the spool 36 to admit air to one side or the other of the piston 38 in the air cylinder, through the inlet lines 40 and 42. Thus, in the position of the parts illustrated in FIGURE 2, compressed air introduced at 43 passes through the check valve 44 and line 40 to hold the die component 20 in a retracted or down position, the line 42 bleeding through the left hand vent port 46.

Figure 8:
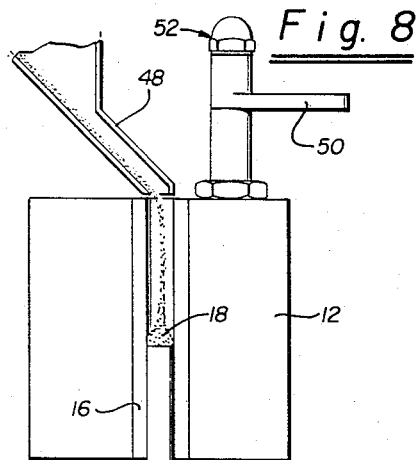
FIGURES 8 to 11 are schematic views illustrating steps in the tableting process performed by the apparatus of FIGURES 1 and 2.
Figure 9:
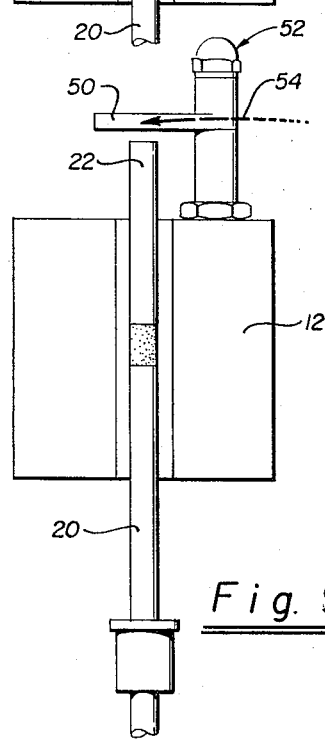

Referring to FIGURE 8, formation of a soluble coffee tablet is initiated by introducing dry, finely divided coffee extract into the unit 10, maintained at a desired forming temperature, through a suitable charging assembly 48. When a desired predetermined quantity has been charged to the tablet forming zone 18, the upper die component 22 is positioned, as in FIGURE 9, and the arm 50 of the stop assembly 52 swung into holding position (arrow 54). In this position the coffee material is loosely held within the tablet forming zone 18, as a free flowing non-cohesive mass. The switch 34 is now reversed to shift the spool 36 to the left, causing compressed air to enter the bottom of the air cylinder through line 42 and the lower die component to move upwardly with a predetermined pressure (arrow 56 in FIGURE 10).

The simultaneous effects of the described rapid application of low pressure and moderate heat to the material within the zone 18 causes the formation of a tablet 60 having a thin, relatively high density, heat softened and compressed outer crust, represented at 62 in FIGURE 3, and a relatively low density slightly compressed interior portion represented at 64. Almost immediately after the tablet is formed, the stop 50 is tripped to one side (arrow 66) allowing the tablet 60 to be ejected upwardly, and out of the forming zone by further movement of the lower die component 20 (arrow 68). The resulting coffee tablet now cools at room temperature to cause a slight hardening of the outer crust portions 64 to produce the final coffee product in tablet form.

Numerous variations are possible in the use of the described apparatus. For example, the size of the tablet can be varied by simply varying the amount of material charged to the tablet forming zone 18. Thus, FIGURE 5 illustrates a larger tablet 70 produced by the introduction of a larger quantity of material to the apparatus. As will be explained, the nature of the processing is such that the desired crust (comprising an open lattice work of compressed, heat-bonded coffee particles) will form on exterior surfaces of the tablet mass, regardless of size, shape or dimension of the tablet.

FIGURES 6 and 7 illustrate the formation of a tablet in spherical form through use of matching concavities in the opposed ends of the modified components 20a and 22a. A tablet produced by this apparatus, represented at 72 in FIGURE 7, is characterized by the same moderately compressed, heat-bonded porous crust or outer layer 74, and lightly compressed interior 76, as described above in connection with the tablets 60 and 70.

Figure 13:
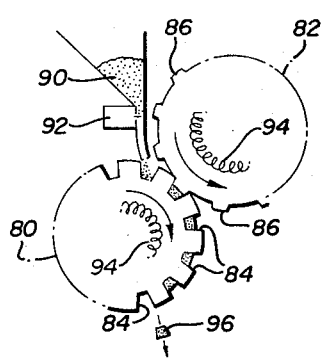
FIGURE 13 is a schematic view, on a reduced scale, of apparatus adapted to continuous operation in accordance with the present invention.

FIGURE 13 illustrates apparatus by which the processing generally described above can be adapted to a continuous operation. Thus, 80 and 82 represent heated rolls provided with mating frusto-conical recesses 84 and projections 86, which perform a function generally analogous to that of the die forming components 20 and 22 in the previously described apparatus. In operation, this apparatus feeds a predetermined quantity of soluble extract material 90, through an appropriate metering device 92, to each of the die openings 84 as they progressively reach a tablet forming position adjacent the roll 82. The proportion of material introduced to each of the forming recesses 84, as well as the spacing of the rolls 80 and 82, is such that the projections 86 produce the exact amount of pressure desired (i.e., within the range from 1 to 40 p.s.i.). The degree of heating of the rolls by the heating elements 94 also is such that the cooperative engagement produces the desired tablet construction.

The resultant tablets 96, which may be discharged from the roll 80 mechanically or by gravity, are each characterized by the above described, moderately compressed, relatively high density, protective outer crust and the lightly compressed, relatively low density, cohesive interior.

It is a feature of the present invention that the process to make the described extract tablets is carried out very rapidly, through simultaneous use of moderate heat and low pressure. The principal benefit of this rapid processing is in the avoidance of a glazed or fused, water impermeable outer surface, which would resist wetting of the tablet interior, and dispersion of the same in the water. This is in contrast to so-called instant coffee tablets known heretofore which, even though dropped into hot water, produce an outer gelatinous surface which is sticky and gummy, and which prevents the tablet from going into solution. The relatively rapid rate of tablet formation also insures that the interior of the tablets remains a loosely aggregated, low density mass of particles, which responds to dispersal and disintegration of the described outer crust (e.g., 62 in FIGURE 3) by readily dispersing in water. As a result, the tablets of the present invention dissolve and disperse upon contact with water at least as fast as conventional soluble or instant powders. In fact, I have found that the coffee tablets, made as herein described, go into solution faster than most coffee powders since they normally dissolve and disperse below the surface of the water, thereby eliminating the problems of floating or frothing normally experienced.

Figure 12:
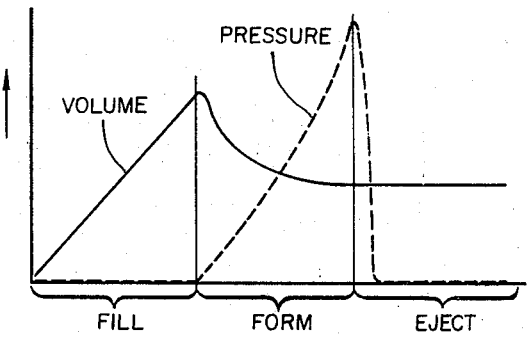
FIGURE 12 is a graphic representation of the tableting process carried out by such apparatus.

Reference is made to FIGURE 12 to illustrate processing times consistent with the foregoing experience. For example, it has been found with apparatus of the type illustrated, that the time required to fill the forming zone 18 with sufficient soluble coffee extract to make a 1 gram tablet (about ½ the portion needed to make a typical cup of coffee) varies between about 1 to 4 seconds, with about 2 seconds normally being employed to accomplish the filling step. Somewhat less time is required to compress the loosely filled mass into the final tablet configuration, ranging from about ½ to 1 second in a typical operation. However, satisfactory results are obtained at compression times as short as 0.1 second, or as long as 8 seconds, depending somewhat on the particular characteristics of the soluble coffee employed. The time required to eject the tablet from the forming zone is likewise quite short, generally requiring about 0.25 second and in no event longer than about 0.75 second. In typical processing, as represented by FIGURES 8 to 11, the total time required to form the tablets is therefore no more than about 2 or 3 seconds and, in any event, within the range from about 1 to 13 seconds.

Another factor of importance to the invention is the moisture content of the dry soluble extract material used as a starting material. I have found, for example, that an outer crust having the desired strength, yet retaining the desired open, lightly bonded, particulate structure, is optimally obtained when the moisture content of the initial soluble coffee extract is within the range from about 2.0 to about 4.6 percent, although satisfactory results can be obtained at moisture contents within the range from about 1.3 to 5.3 percent. A drier powder (i.e., below about 1.3 moisture content) tends to insulate itself, causing insufficient surface bonding or adhesion of the particles and inadequate transfer of heat to the interior of the tablet during the forming step. In contrast, too high a moisture content (i.e., in excess of about 5.3%) not only induces excessive heat transference to the interior of the tablet, causing it to solidify into an undesirably cohesive mass, but also tends to produce a glazed shell surrounding the tablet. The latter is more or less impervious to penetration by water so that the tablets do not readily dissolve. Excessive moisture content also tends to shorten shelf life and to reduce product quality.

In the practice of my invention, I have found it desirable to employ an insulating liner, or similar insulating medium 16 to control the flow of heat to the tablet surface. In general, use of a suitable insulating liner in the space surrounding the forming zone 18 insures a rapid uniform heat transfer to the peripheral layers of extract material, almost immediately upon contact, while eliminating sticking or other evidence of uneven heating. This is explained by the poor heat conductivity through the liner, which permits the small amount of heat stored within the liner to be rapidly dissipated on contact with the exposed surfaces of the charged material. The use of the insulating liner 16 also permits higher temperatures to be employed adjacent the peripheral surfaces of the tablet, permitting a higher rate of heat transference without undesired localized heating or fusion of the tablet material at the contact interface.

The foregoing advantages of the invention are exemplified in the specific examples of its practice set forth in the following Table I. In preparing this table, 1 gram samples of commercially available soluble coffee, having varying moisture contents as indicated in the table and a bulk density of approximately 15 pounds per cubic foot, were introduced to apparatus of the type illustrated in FIGURE 1, operated at the forming temperatures and pressures and within the compression times specified in the table.

TABLE I

| Source Soluble Coffee | Tablet Size, Grams | Moisture, Percent | Temp., °F. | Forming Conditions | |
|---|---|---|---|---|---|
| | | | | Pressure (p.s.i.) | Time [1] (Sec.) |
| General Foods (Sanka) | 0.5 | 2.0 | 300 | 4 | 2.0 |
| Maxwell House | 1.0 | 2.5 | 284 | 2 | 6.0 |
| Hills Bros | 1.0 | 2.7 | 284 | 2 | 5.0 |
| Do | 1.0 | 2.7 | 298 | 4 | 0.5 |
| Chase & Sanborn | 0.5 | 3.1 | 283 | 3 | 2.0 |
| Do | 1.0 | 3.1 | 283 | 3 | 2.0 |
| Hills Bros., Exper.[2] | 0.5 | 3.3 | 255 | 3 | 1.0 |
| Hills Bros., Exper.[3] | 1.0 | 3.6 | 256 | 2 | 1.0 |
| Folgers | 0.5 | 4.0 | 256 | 3 | 1.0 |
| Hills Bros., Exper.[4] | 1.0 | 4.6 | 256 | 2 | 1.0 |
| Hills Bros., Exper.[5] | 0.7 | 5.3 | 244 | 3 | 1.5 |

[1] Compression and ejection.
[2] Foam dried powder with 3% added foaming agents.
[3] High moisture product.
[4] Low yield product.
[5] Freeze dried product.

The resulting coffee tablets exhibited a self-supporting, relatively high density outer crust of lightly compressed, heat bonded coffee particles, and a cohesive, relatively low density interior of loosely aggregated coffee particles. Each table was roughly ½ inch in diameter and 1¼ inch in length, and had a bulk density of approximately 30 pounds per cubic foot, representing a decrease in volume of approximately 50 percent. Upon being broken open, the crust thickness was observed to be of the order of 0.01 to 0.015 inch. In use, the tablets were relatively nonhygroscopic and have exhibited excellent shelf life, in the sense of retention of desired quality and flavor, over appreciable periods of storage. Upon being deposited, two at a time, in approximately 120 cc. of hot tap water, the tablets dispersed and dissolved within a few seconds (2 to 6) to produce a satisfactory coffee beverage equivalent in quality, taste and aroma to that of the soluble powder from which it was produced. Virtually identical results were also obtained with 0.5 and 1.5 gram samples of soluble coffee, processed under conditions equivalent to those set forth in Table I. Using the latter tablets, it was found that four or five of the 0.5 gram tablets could be employed to make a satisfactory cup of coffee, to taste, whereas one or two of the larger tablets likewise produced mild or strong coffee, possessing the characteristics of the initial soluble coffee powder.

In addition to the foregoing, satisfactory tablets have been made with commercially available soluble or "instant" tea products, including all tea and filled tea products.

Satisfactory results are also obtained when the soluble extract powders are dry mixed with a commercially available soluble or instant cream product (i.e., Pream, as manufactured by the H. C. Moore's Company, Columbus, Ohio, under U.S. Patents Nos. 2,503,866 and 2,933,393). Examples of such tablets are set forth in Table II below:

TABLE II

| Material and source | Tablet Size, Grams | Temp., °F. | Forming Conditions | |
|---|---|---|---|---|
| | | | Pressure (p.s.i.) | Time (Sec.) |
| 100% Soluble Tea (Tender Leaf Tea Co.) | 0.5 | 298 | 2 | 0.5 |
| 50% Soluble Tea, 50% Malto dextrin filler (Lipton Tea Co.) | 0.5 | 292 | 3 | 1 |
| 50% Soluble Coffee (Hills Bros.) 50% Soluble Cream (H. C. Moore's) | 0.7 | 253 | 2 | 1 |

It will be appreciated that the malto dextrin is employed by the manufacturer to improve the drying characteristics of the tea product, whereas the instant cream is employed to impart a taste variation to the coffee product. Such use of fillers and additives is permissible so long as the operating conditions during tableting (i.e., time, temperature, pressure, etc.) are such that the added materials do not appreciably alter the essential desired characteristics of the tablets or otherwise interfere with the basic concepts of the invention.

The particular tablets, produced as in Table II, were observed to have a self-supporting, relatively high density outer crust and a cohesive, relatively low density interior, composed generally of loosely aggregated soluble particles. When added to hot tap water at a rate of three to six of the tablets per cup (i.e., to achieve a desired strength or taste), the tablets produced a satisfactory beverage which was equivalent in quality and taste and aroma to beverages produced from the original soluble powders. In other words, no observable difference was noted in a cup of tea made with the tablets, as above described, when compared with a like beverage made with equivalent amounts of the instant tea powders. In like fashion, the coffee tablets made with the addition of a dry creaming powder, produced a beverage substantially identical in quality and taste to a beverage prepared with equivalent amounts of the dry powders, as commercially sold and distributed. The tablets additionally provided the advantage that they were more readily handled, and generally dissolved at a somewhat faster rate than the powdered products.

It is apparent from the foregoing that I have provided a new and improved soluble beverage tablet which has good keeping qualities as well as excellent handling characteristics. The tablets are also characterized by excellent solubility in hot or cold water, at least equivalent to that of commercially available beverage extracts in powdered form. The tablets additionally exhibit improved characteristics with respect to reduced loss of flavor and moisture pickup, during prolonged periods of storage. I have also provided a method or process in which the soluble beverage tablets can be formed at low pressures through use of moderate temperatures, without the use of binders or additives. I have also disclosed appropriate means for making the tablets of the invention as well as processing conditions to obtain the desired surface and interior characteristics which render my tablets uniquely adapted to the intended purpose. I have additionally disclosed that various additives may be introduced into the tablets, without varying their basic properties as herein described and claimed.

Many variations are possible in the processing and will naturally occur to those skilled in this art. For example, while use of an insulating liner has proved highly satisfactory as a means to control the flow of heat to the tablet surface, it is contemplated that inductive heating with high frequency heat radiation might be employed as a satisfactory alternative. Considerable variation in the tablet configuration is also contemplated, as well as in the application and use of the tablets. By way of illustration, spherical tablets are indicated as highly successful for vending machine use. These and other variations are considered to be clearly within the scope of the invention disclosed herein, as defined in the appended claims.

I claim:

1. In a process for forming tea and coffee beverage extracts into highly soluble self-supporting tablets, the steps of depositing a quantity of dry finely divided beverage extract in a forming zone, heating exterior surface portions of beverage extract within said zone to a temperature within the range from 190 to 325° F. sufficient to cause some heat bonding of extract particles within said surface portions, simultaneously applying a relatively low pressure not in excess of 40 p.s.i. to said exterior surface portions to assist in forming a cohesive tablet having a thin shape-retaining heat softened and compressed outer crust, and ejecting the tablets from said zone.

2. A process as in claim 1 wherein said beverage extract is soluble coffee.

3. A process as in claim 2 wherein the extract material deposited in said zone is soluble coffee having a moisture content within the range from about 1.3 to about 5.3 percent.

4. A process for the manufacture of a shape-retaining highly soluble coffee extract tablet, comprising the steps of introducing a quantity of dry finely divided coffee extract into a forming zone, said extract having a moisture content within the range from about 1.3 to 5.3 percent, applying heat within the range of 190 to 325° F. to exterior surface portions of said extract material within said zone, simultaneously applying a relatively low pressure within the range of from 1 to 40 p.s.i. to exterior surface portions of said extract material, to thereby form a cohesive tablet having a relatively low density interior and a relatively thin high density outer crust of heat bonded extract particles, and ejecting the extract tablets so formed from said zone.

5. In a process for forming tea and coffee beverage extract into highly soluble self-supporting tablets, the steps of preheating a tablet forming zone to a temperature within the range of from 190 to 325° F., rapidly introducing a quantity of dry finely divided extract material into said forming zone, applying relatively low pressure ranging from 1 to 40 p.s.i. to exterior surface portions of said extract material for a period of time sufficient to form said exterior surface portions into a thin, partially heat bonded, shape-retaining crust about remaining portions of extract material within said zone, and ejecting the extract tablets so formed.

6. A process as in claim 5 wherein the time required to introduce said extract material into said forming zone is less than about 4 seconds.

7. A process as in claim 5 wherein the period of time to sufficiently compress said exterior surface portions is within the range from 0.1 to 8 seconds.

8. A process as in claim 7 wherein the total period of time required to introduce the extract material and to thereafter eject the extract tablets from said forming zone is within the range from 1 to 13 seconds.

References Cited by the Examiner

UNITED STATES PATENTS

| | | | |
|---|---|---|---|
| 1,240,020 | 9/1917 | Boberg et al. | 99—71 X |
| 2,380,092 | 7/1945 | Weisberg | 99—71 |

FOREIGN PATENTS

| | | |
|---|---|---|
| 12,440 | 3/1880 | Germany. |
| 5,034 | 1882 | Great Britain. |
| 23,379 | 1902 | Great Britain. |

A. LOUIS MONACELL, *Primary Examiner.*

RAYMOND N. JONES, M. W. GREENSTEIN,
*Assistant Examiners.*